United States Patent
Molin et al.

(10) Patent No.: US 10,518,605 B2
(45) Date of Patent: Dec. 31, 2019

(54) AIRCRAFT TURBOMACHINE COMPRISING A DEFLECTOR

(71) Applicant: Airbus Operations (SAS), Toulouse (FR)

(72) Inventors: Nicolas Molin, Nailloux (FR); Guillaume Clairet, Toulouse (FR); Cedric Leconte, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 1020 days.

(21) Appl. No.: 14/809,702

(22) Filed: Jul. 27, 2015

(65) Prior Publication Data

US 2016/0031290 A1 Feb. 4, 2016

(30) Foreign Application Priority Data

Jul. 31, 2014 (FR) .................................. 14 57430

(51) Int. Cl.
*F02C 7/045* (2006.01)
*B64D 33/02* (2006.01)
(Continued)

(52) U.S. Cl.
CPC ......... *B60H 1/00564* (2013.01); *B64D 33/02* (2013.01); *F02C 7/045* (2013.01);
(Continued)

(58) Field of Classification Search
CPC .. F02C 7/04; F02C 7/045; F02C 7/047; F02C 7/05; F02C 7/052; F02C 7/055;
(Continued)

(56) References Cited

U.S. PATENT DOCUMENTS

| 6,655,632 B1 | 12/2003 | Gupta et al. |
| 6,698,691 B2 * | 3/2004 | Porte ..................... B64D 15/04 |
| | | 244/134 B |

(Continued)

FOREIGN PATENT DOCUMENTS

| EP | 1714871 | 10/2006 |
| WO | 2005088104 | 9/2005 |

OTHER PUBLICATIONS

French Search Report, dated Mar. 24, 2015.

*Primary Examiner* — Jason H Duger
(74) *Attorney, Agent, or Firm* — Greer, Burns & Crain, Ltd.

(57) ABSTRACT

An aircraft turbomachine comprising a fan conduit with a wall, a flow of air passing through the turbomachine via the fan conduit. An air passage comprising an air opening is arranged in the wall, the air passage configured to receive a portion of the flow of the air through the fan conduit. A deflector is fixed to the wall upstream of the air opening, the deflector comprising at least one cross-section extending in the fan conduit to capture the flow of air. The at least one cross-section is porous. The deflector protects the air passage structure and is easy to produce and to fix to the wall of the fan conduit when it is screwed or riveted directly thereto. The deflector, as a result of its location in the fan conduit, is easy to access and thus allows rapid maintenance operations without having to disassemble the air passage.

12 Claims, 8 Drawing Sheets

(51) Int. Cl.
*B60H 1/00* (2006.01)
*F02K 1/82* (2006.01)
*F02C 9/18* (2006.01)

(52) U.S. Cl.
CPC .............. *F02C 9/18* (2013.01); *F02K 1/827* (2013.01); *B64C 2230/14* (2013.01); *B64D 2033/0206* (2013.01); *B64D 2033/0286* (2013.01); *F05D 2250/182* (2013.01); *F05D 2250/191* (2013.01); *Y02T 50/166* (2013.01)

(58) Field of Classification Search
CPC ............ F02C 9/18; B60H 2001/00085; B60H 1/00564; F05D 2250/182; F05D 2250/191; F05D 2250/51; B64C 23/00; B64C 23/005; B64C 23/04; B64C 23/06; B64D 2033/0206; B64D 2033/0226; B64D 2033/0273; B64D 2033/0286; B64D 13/06; B64D 33/02; B64D 2241/00; F02K 1/827; F02K 3/06; F15D 1/0055

See application file for complete search history.

(56) References Cited

U.S. PATENT DOCUMENTS

| | | | |
|---|---|---|---|
| 9,463,754 B2* | 10/2016 | Patience | ............... B64C 23/005 |
| 9,487,289 B2* | 11/2016 | Patience | ................ B64C 21/02 |
| 9,493,233 B2* | 11/2016 | Patience | ............... B64C 23/005 |
| 2005/0204743 A1 | 9/2005 | Leblanc | |
| 2006/0231329 A1 | 10/2006 | Borja et al. | |
| 2010/0126182 A1* | 5/2010 | Hoover | ................ F01D 17/105 60/785 |
| 2010/0205975 A1* | 8/2010 | Cloft | ..................... B64D 33/02 60/772 |

* cited by examiner

AIRCRAFT TURBOMACHINE COMPRISING A DEFLECTOR

CROSS-REFERENCES TO RELATED APPLICATIONS

This application claims the benefit of the French patent application No. 1457430 filed on Jul. 31, 2014, the entire disclosures of which are incorporated herein by way of reference.

BACKGROUND OF THE INVENTION

The present invention relates to devices for eliminating the phenomena of acoustic resonance inside a cavity and relates in particular to an aircraft turbomachine comprising a deflector which is arranged in a fan conduit in order to eliminate such phenomena in the air passage of an exchanger.

A dual-flow turbomachine generally comprises an air intake system in order to provide air to the air consuming systems of the aircraft such as, for example, the system for renewal and regulation of the air pressure in the cabin or de-icing systems. The air intake system takes in warm air in the region of the hot portions of the turbomachine and cold air in the region of the fan conduit of the turbomachine. So that the temperature of the air supplied to the aircraft air systems remains within acceptable limits, the air intake system comprises an exchanger (PCE) in which the flows of cold and hot air intersect. The cold air is conveyed to the exchanger via an air passage which connects the exchanger to the fan conduit in a fluidic manner. The passage comprises an air inlet opening at the upstream end thereof and a valve of the butterfly type which is located at the downstream end thereof, in the region of the exchanger. The opening angle of the butterfly valve is controlled in accordance with the air requirements of the consumer systems.

The inlet opening is level with the wall of the fan conduit in order to reduce the aerodynamic impact thereof, in particular the drag thereof. With such a geometry, however, when the butterfly valve is closed or almost closed, a shear flow layer which extends through the opening and which is level with the wall of the fan conduit is formed. The interaction of the shear flow layer with a downstream inlet edge of the inlet opening creates acoustic waves which propagate and are amplified in the passage between the valve and the shear layer. Some of these waves have frequencies which are close to the resonance frequency of the passage which may bring about acoustic resonance phenomena of the cavity.

SUMMARY OF THE INVENTION

In this manner, there is a need for a turbomachine which comprises a device in order to eliminate the phenomena of acoustic resonance inside the passage of exchanger air when the exchanger is closed or almost closed. An object of the present invention is to meet this need and it relates to an aircraft turbomachine which comprises a fan conduit which comprises a wall, a flow of air which passes via the fan conduit; an air passage which comprises an air opening which is arranged in the wall, the air passage being configured to receive a portion of the flow of the air of the fan conduit; a deflector which is fixed to the wall upstream of the air opening in the flow direction of the air, the deflector comprising at least one cross-section which extends in the fan conduit in order to capture the flow of air, the at least one cross-section being porous.

The porous deflector according to the invention performs a function of protection of the air passage structure and is easy to produce and to fix to the wall of the fan conduit when it is screwed or riveted directly thereto. Furthermore, the deflector, as a result of its location in the fan conduit, is easy to access and thus allows rapid maintenance operations without having to disassemble the air passage.

BRIEF DESCRIPTION OF THE DRAWINGS

The features of the invention mentioned above, and others, will be appreciated more clearly from a reading of the following description of embodiments, the description being set out in relation to the appended drawings, in which.

DETAILED DESCRIPTION OF THE PREFERRED EMBODIMENTS

Figure 1:
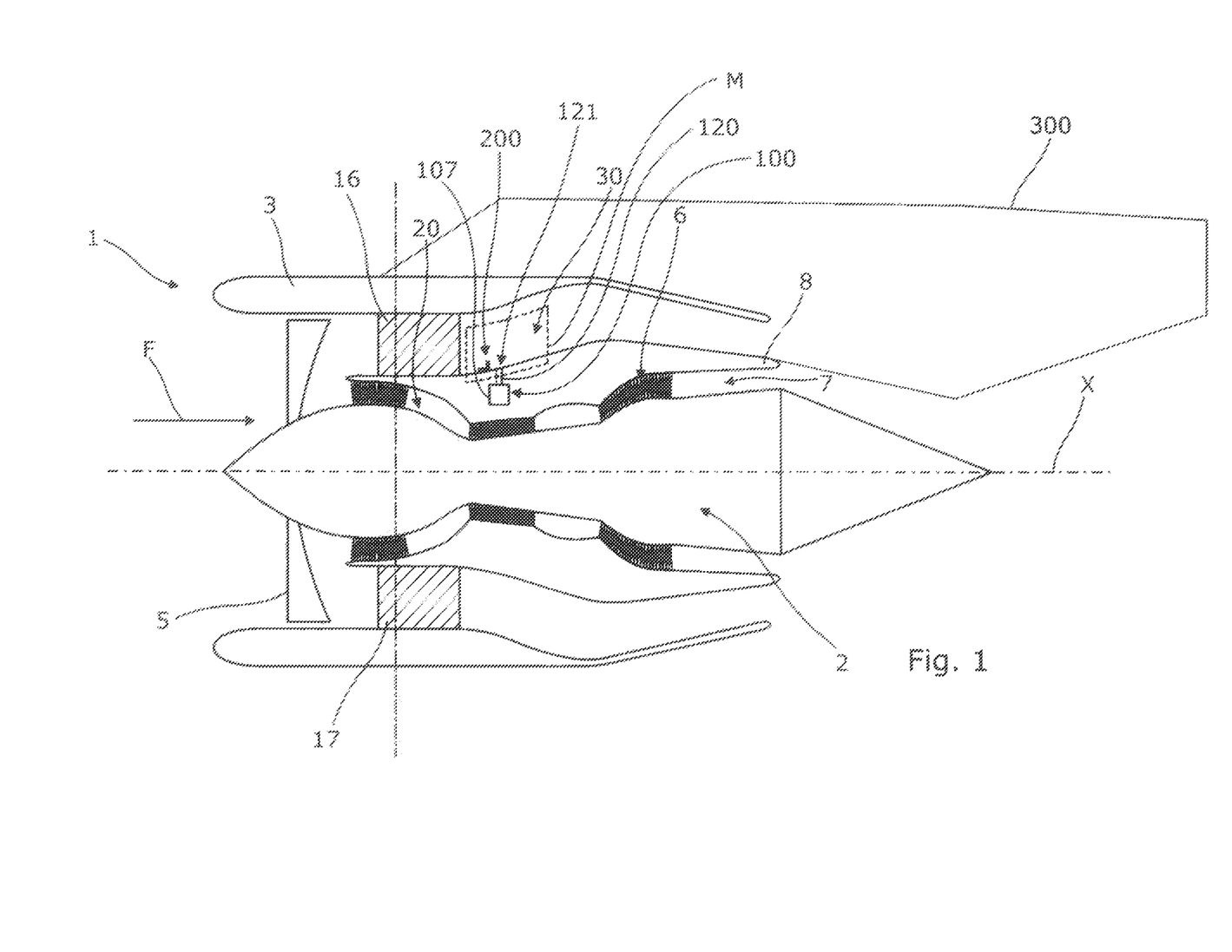
FIG. 1 is a schematic view along a longitudinal cross-section of a turbomachine comprising an air intake system which is provided with a cooling air passage and a deflector according to an embodiment of the invention.

With reference to FIG. 1, a dual flow turbomachine 1 comprises an annular pod 3 which is centered on a longitudinal axis X and which surrounds an engine 2.

In the flow direction of a flow of air which passes through the turbomachine 1 and which is indicated by the arrow F in FIG. 1, the engine 2 comprises, in a state centered on the longitudinal axis X thereof, a fan 5, an engine body 6 and a nozzle 7.

In the remainder of the description, the terms "upstream" and "downstream" are intended to be considered relative to the flow direction of the flow of air which passes through the turbomachine 1.

The engine body 6 comprises elements which allow the fan 5 to be rotated when the engine 2 is started. The turbomachine 1 further comprises, downstream of the fan 5, an annular intermediate stream 8 which is concentric with the engine body 6 and which delimits therewith an annular flow channel 20 of hot air.

The pod 3 constitutes the outer casing of the turbomachine 1 and surrounds the intermediate stream 8 with which it is concentric. The pod 3 thus delimits with the intermediate stream 8 an annular stream of cold air flow, referred to as the fan conduit 30. The fan conduit 30 extends as far as the nozzle 7.

The engine 2 is fixed to an engaging pole 300 and is fixed to the pod 3 using two diametrically opposed branches 16, 17 which ensure mechanical cohesion of the turbomachine 1 by connecting, in particular, the pod 3 and the intermediate stream 8 together.

Figure 2:
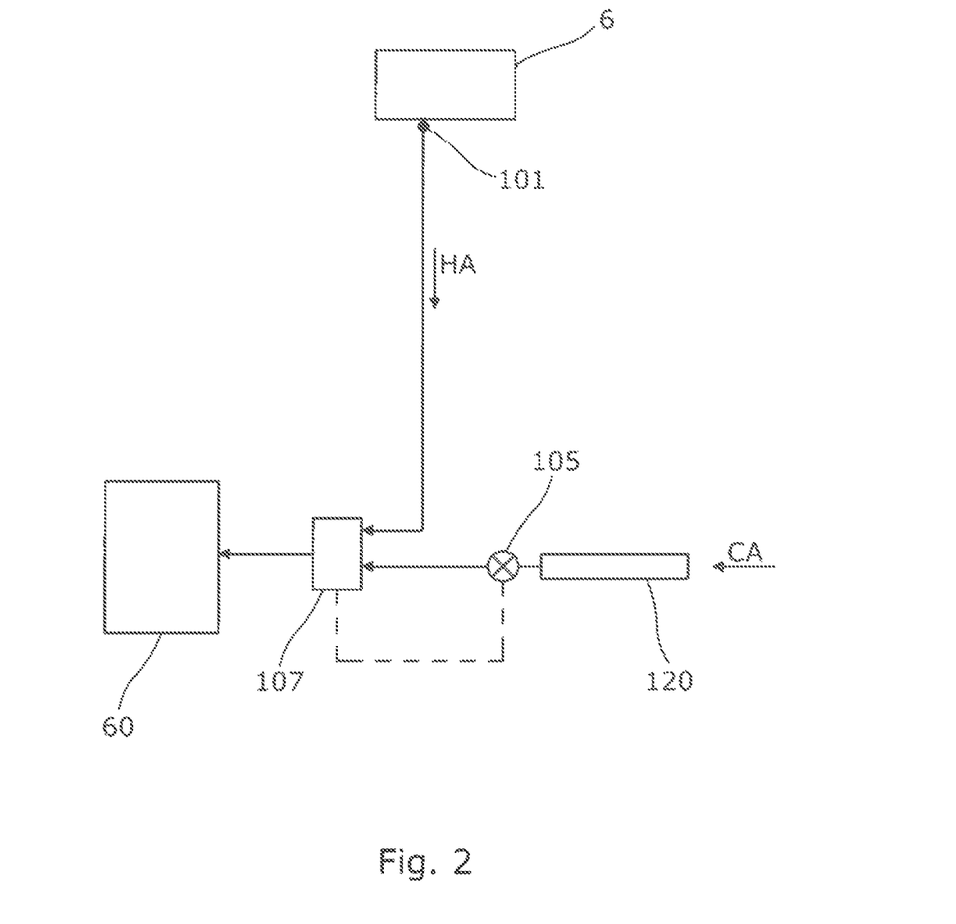
FIG. 2 is a schematic view illustrating the arrangement of the different components of the air intake system of FIG. 1.

With reference to FIGS. 1 and 2, the turbomachine 1 comprises, in known manner, an air intake system 100 in order to supply air to one or more air consumption systems 60.

The air intake system 100 comprises, in a state arranged, for example, in the thickness of the intermediate stream 8:
- an exchanger 107 which receives at the inlet a flow of hot air HA and a flow of cold air CA. The exchanger 107 is connected in fluidic terms at the output to at least one air consumption system 60, for example, arranged in the thickness of the intermediate stream 8;
- at least one air intake 101 which is intended to take hot air HA into the engine body 6 in order to convey it to the inlet of the exchanger 107;
- an air passage 120 which is formed in the intermediate stream 8 and which connects the fan conduit 30 to the exchanger 107 and via which cold air CA conveyed to the inlet of the exchanger 107 passes;
- a control valve 105 which is located at a downstream end of the air passage between the passage and the exchanger 107. The valve is connected in fluidic terms to an inlet of the exchanger 107. The valve 105 is, for example, of the butterfly type, with the opening angle thereof controlled in accordance with the needs of the air consuming systems 60.

Figure 3:
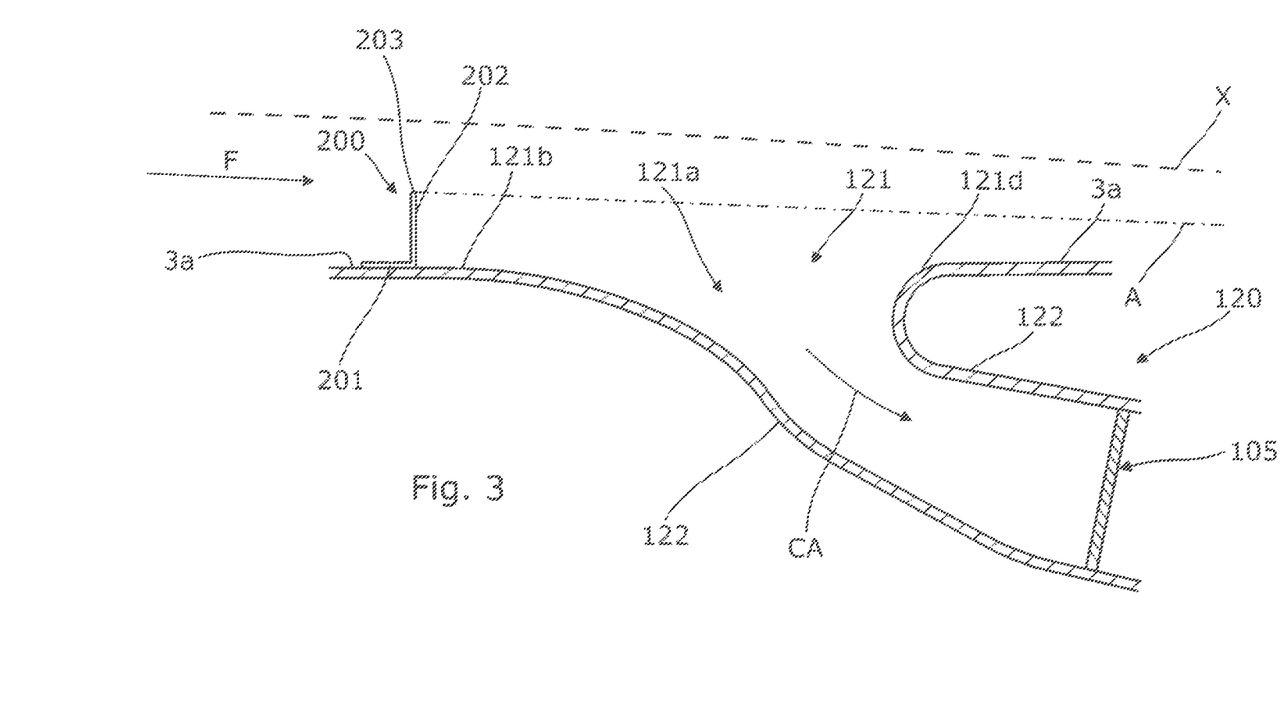
FIG. 3 is an enlarged view of the zone M of FIG. 1 and illustrates the air passage and the deflector according to a first embodiment of the invention.
Figure 4:
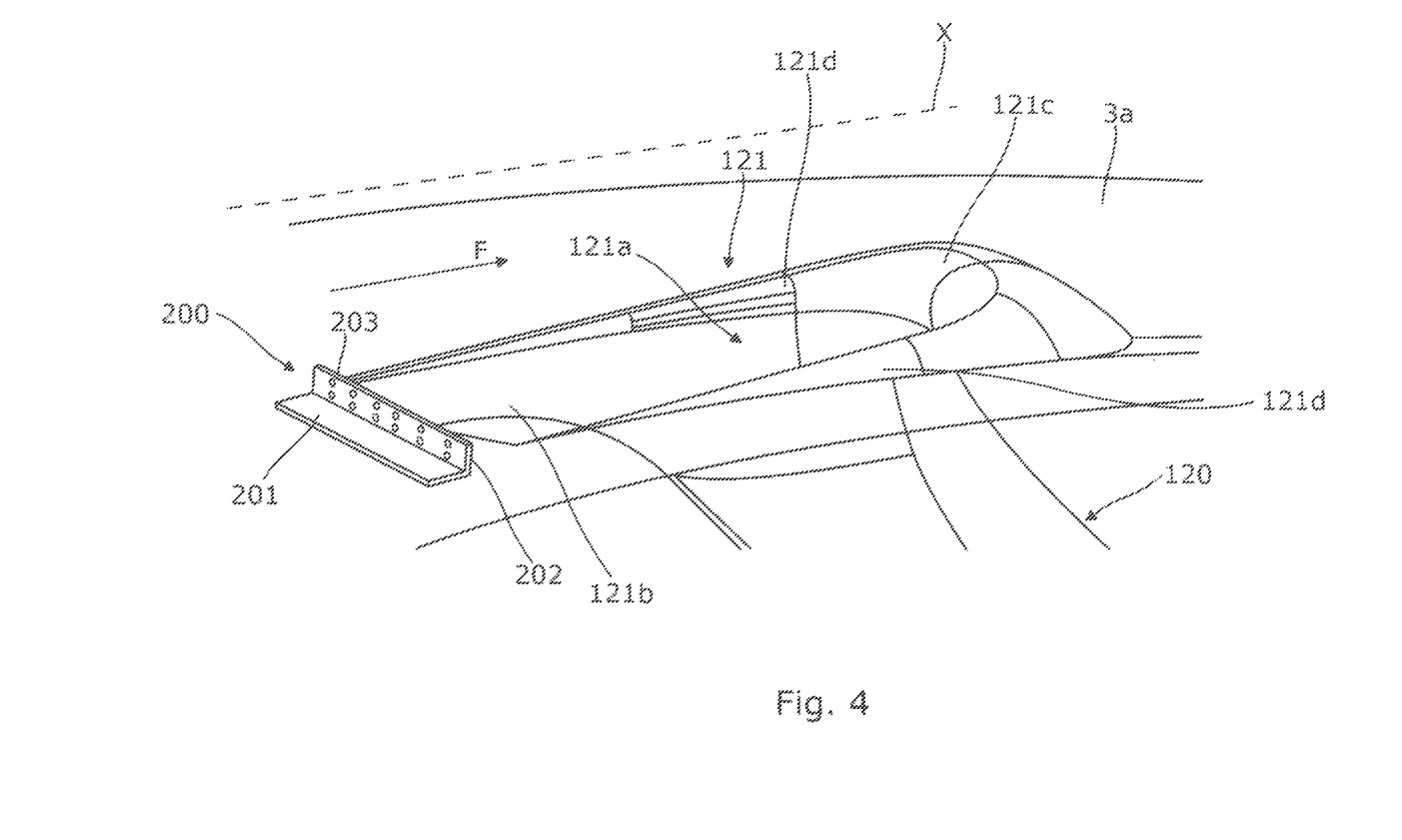
FIG. 4 is another view of the air passage and the deflector according to a first embodiment of the invention.

With reference to FIG. 3 and FIG. 4, the air passage 120 is delimited by an air inlet 121 at the upstream end thereof, different passage structures 122, and the control valve 105. The air inlet 121 comprises an inlet opening 121a which is formed between an upstream inlet edge 121b, a downstream inlet edge 121c and lateral walls 121d which connect the upstream and downstream inlet edges and which extend substantially along the longitudinal axis X. In known manner, the air passage 120 is orientated at an angle α, with α generally being between 5° and 50° relative to the tangent local to the wall 3a of the fan conduit on which the air inlet 121 rests, in order to facilitate the flow of cold air CA originating from the fan conduit 30.

In the open position of the control valve (not illustrated), cold air CA flows into the inlet opening 121a, along the air passage 120, toward the exchanger 107.

In the closed position of the control valve (illustrated in FIG. 3), cold air CA flows through the inlet opening 121a, but is blocked in the region of the control valve 105.

According to the invention, the turbomachine 1 is provided with a deflector 200 which is arranged on the wall 3a of the fan conduit upstream of the air inlet opening 121a. The deflector 200 is substantially L-shaped and is sized so as to extend over a width which represents from 60% to 110% of the width of the inlet opening, the width being understood to be the dimension between the lateral walls 36.

The deflector 200 is integrally formed from a rigid material such as, for example, titanium or aluminum.

With reference to the examples described in FIGS. 3 and 4, the base of the L is fixed to the wall 3a of the fan conduit by means of screwing or riveting, while the cross-section 202 of the L, which is perpendicular to the base 201 and is located downstream thereof, extends radially out of the wall 3a of the fan conduit 30.

The deflector 200 is said to be porous in the remainder of the description, in that it comprises a plurality of elements 210 for the air passage which are arranged on the cross-section 202.

Figure 5:
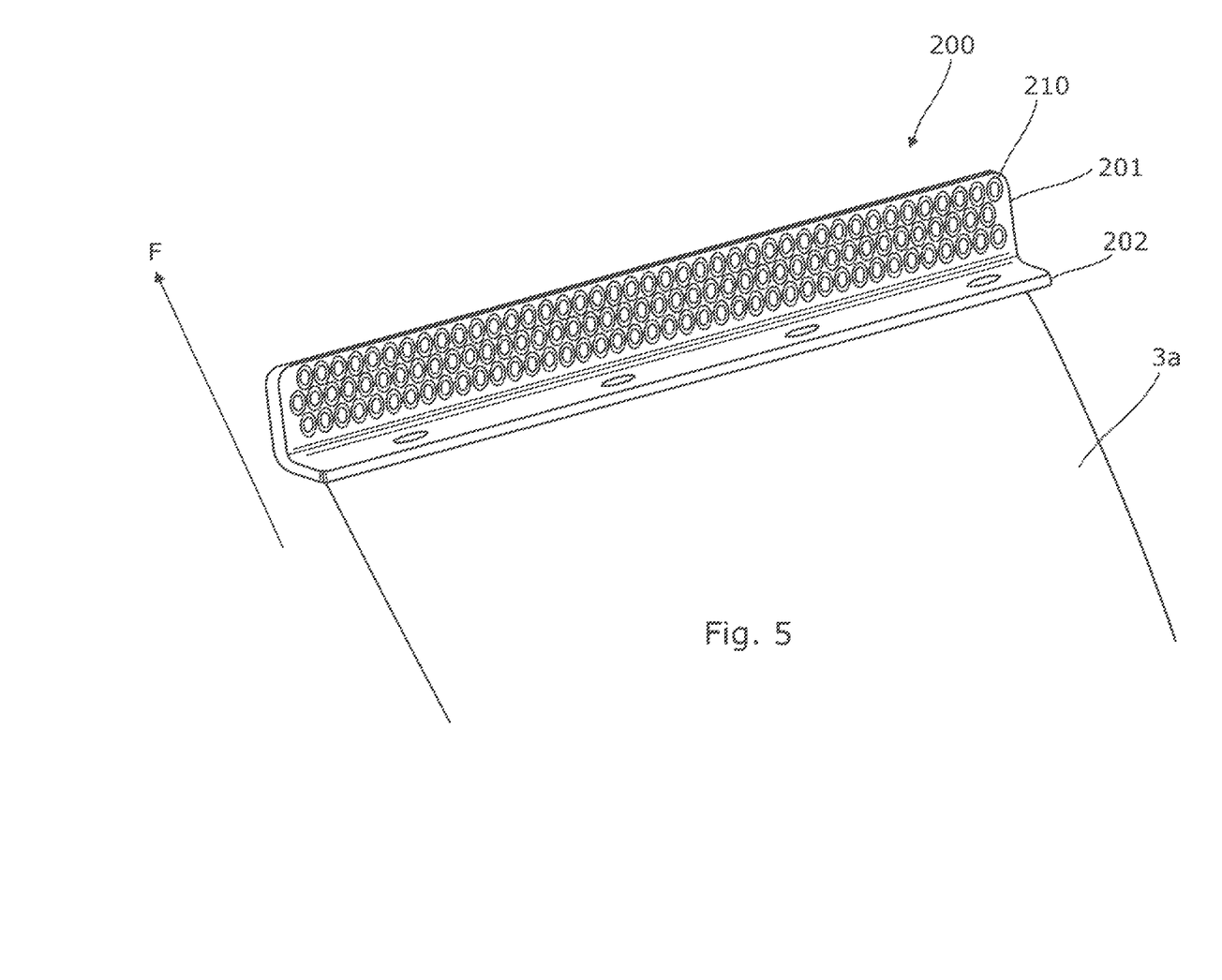
FIG. 5 is a front view in relief of the deflector according to a first embodiment of the invention.

With reference to FIG. 5, and in a first embodiment of the invention, the elements 210 for the air passage are through-holes which are arranged in a line or in a column. The through-holes have diameters which are different or all the same, but which are preferably greater than 2 mm and less than 4 mm, these two values being included.

It should be noted that, in the example of FIG. 5, the holes all have the same diameter and are distributed over the surface of the cross-section 202 so as to form repetitive patterns. In this manner, the holes are distributed in lines where one line in two is offset by half of a hole relative to the preceding or following line so as to form a zig-zag pattern.

According to the invention, the sum of the surfaces of the through-holes represents from 20% to 40% of the total surface of the cross-section 202. In this manner, during use with the control valve 105 open, the elements 210 for the air passage have the effect of allowing to pass approximately from 10% to 30% of the portion of the flow of cold air CA which passes in the fan conduit 30 and which arrives at the cross-section 202 of the deflector. The porous deflector 200 according to the invention therefore brings about a smaller loss of load compared with a solid deflector.

During use, when the control valve 105 is closed, the deflector 200 forces the shear flow layer to flow in a plane (indicated by the line A in FIG. 3) parallel with the longitudinal axis X and adjacent to the free edge 203 of the cross-section of the deflector 202 in order to prevent the shear flow layer from striking the downstream inlet edge 121d. In this manner, the cavity 120 is not thus excited by occurrences of turbulence of the shear flow layer and the appearance of resonance phenomena is eliminated.

Advantageously, the porous deflector 200 according to the invention has increased efficiency when the cross-section 202 has a length, in a radial dimension of the fan conduit and in a state measured from the base 201, which represents between ⅒th and ⅓₀th of the dimension of the inlet opening 121a in the longitudinal axis X.

According to the invention, the porous deflector 200 performs a function of protection of the air passage structure 120 and is easy to produce and to fix to the wall 3a of the fan conduit 30 when it is screwed or riveted directly thereto. Furthermore, the deflector, as a result of the location thereof in the fan conduit, is easy to access and thus allows rapid maintenance operations without having to disassemble the air passage 120.

It should be noted that, as a secondary advantage of the invention, when the control valve is closed, the deflector 200 eliminates the tonal noise which is generally encountered for the air openings which are at the surface of the wall of the fan conduit since the shear flow layer deflected by the deflector does not strike the downstream inlet edge 121d of the air opening.

Figure 6:
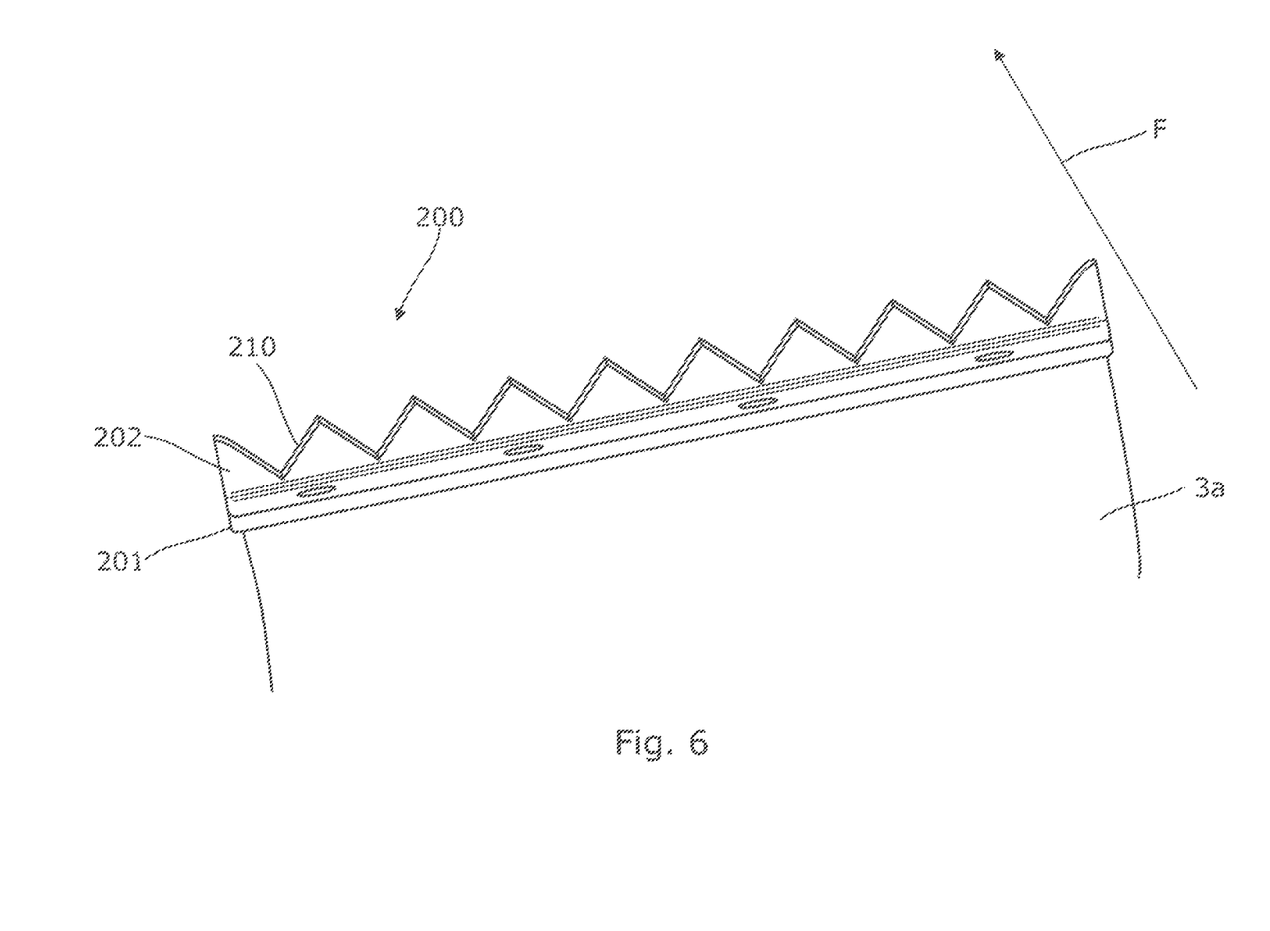
FIG. 6 is a front view in relief of the deflector according to a second embodiment of the invention.

With reference to FIG. 6 and in a second embodiment of the invention, the elements 210 for the air passage are notches which are arranged at the free edge 203 of the cross-section 202 of the deflector, that is to say, over the width of the inlet opening.

The notches are all identical with a triangular shape whose tip is located close to the base 201 and the base in the region of the free edge 203 of the cross-section 202. Each notch extends over a length (from the base to the tip thereof) representing between 60% and 90% of the length of the cross-section 202 in a radial dimension of the fan conduit and in a state measured from the base 201. Preferably, the tip of a notch is from 1 to 3 mm away from the base 201, in a radial dimension of the fan conduit.

Furthermore, the angle at the tip of a notch is preferably equal to Π/2 radians, or 90 degrees.

Compared with the first embodiment set out above, the deflector 200 brings about smaller losses of load.

Without departing from the scope of the present invention, the porosity of the deflector 200 as defined above could be obtained with other types of elements for the air passage 200 or a combination of different types of elements for air passage. In this manner, a deflector 200 on the cross-section of which both holes and notches would be arranged is included within the scope of the present invention.

Figure 7:
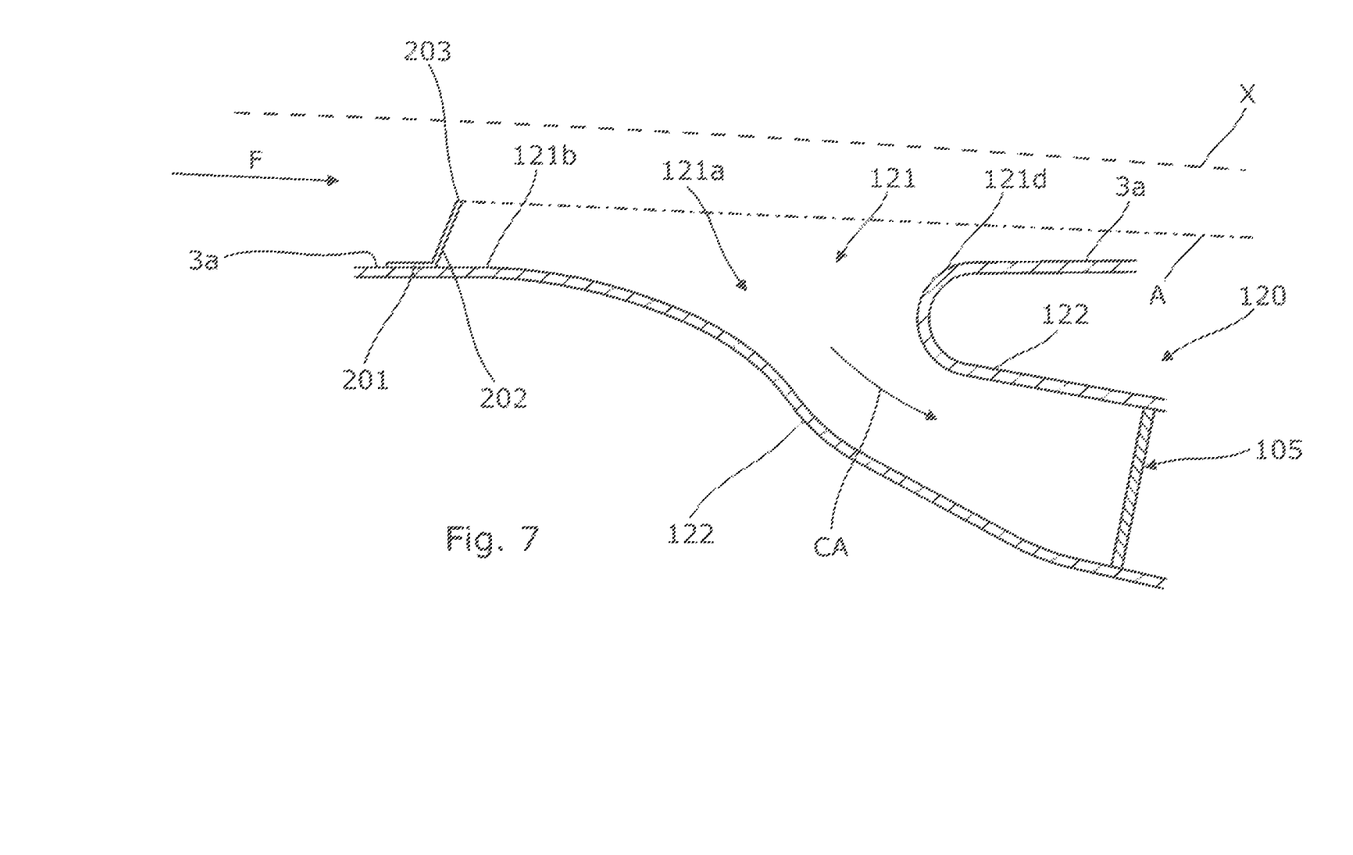
FIG. 7 is a view similar to FIG. 3 in which the deflector is produced according to a first variant of the invention.

In a first variant of the embodiments described, and with reference to FIG. 7, the base 201 of the deflector and the cross-section 202 thereof are not perpendicular but the cross-section 202 extends outside the base in the direction of the inlet opening 121a with an angle β between the base and the cross-section less than Π/2 radians (less than 90 degrees).

The advantage of this variant is to limit the deviation of the flow of cold air CA passing in the fan conduit 30 and thus to reduce the drag brought about by the deflector 200.

Figure 8:
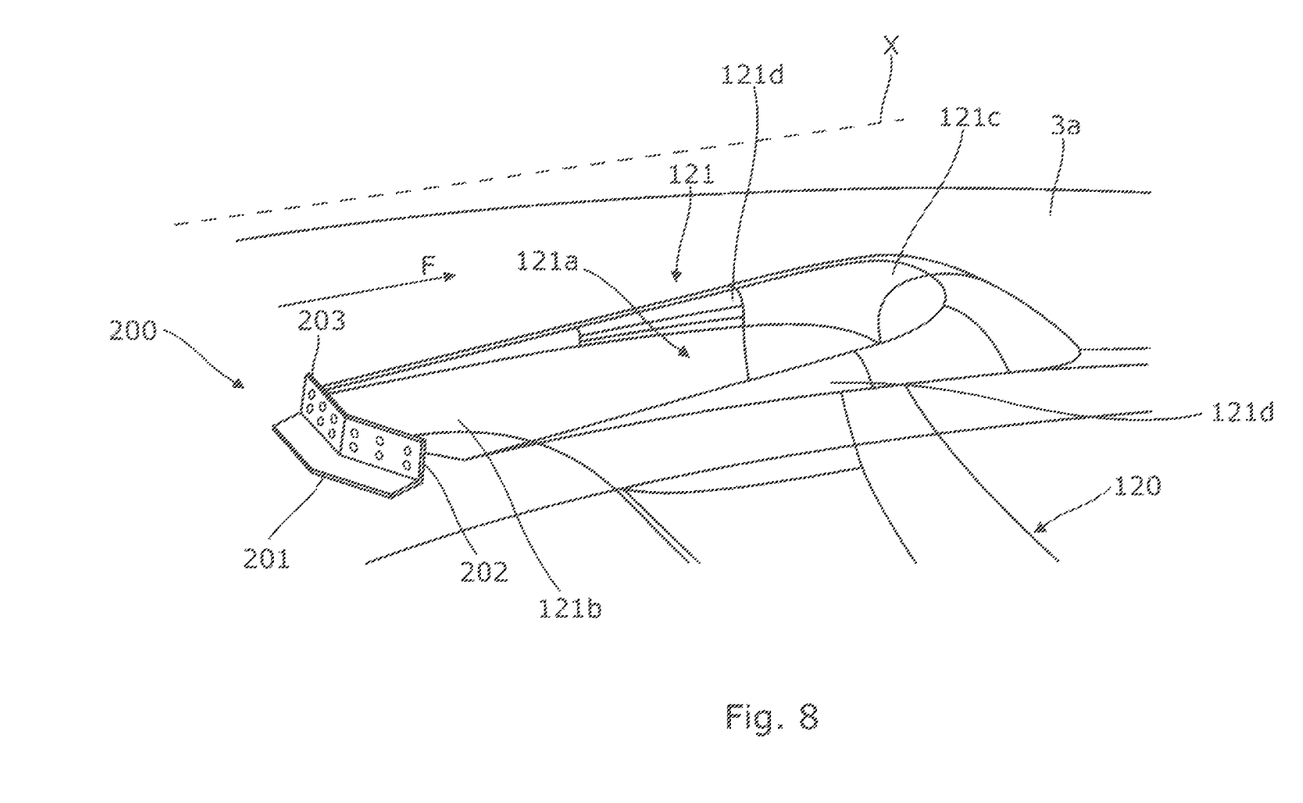
FIG. 8 is a view similar to FIG. 4 in which the deflector is produced according to a second variant of the invention.

In a second variant of the embodiments described, the deflector 200 is inscribed in a line which is located in a plane adjacent to the wall 3a of the fan conduit 30 and whose center is located in the region of the air inlet 121. According to this variant, the deflector is either curved (not illustrated) or, as illustrated in FIG. 8, produced in two equal portions (each comprising a base and a cross-section) which are fixed to each other with an angle between them which is not equal to zero.

The advantage of this variant is to limit the deviation of the flow of cold air CA which passes in the fan conduit 30 and thus to reduce the drag brought about by the deflector 200.

Although in the example described above, the air intake system 100 and in particular the air passage 120 are arranged in the thickness of the intermediate stream 8, these elements, in particular the air passage, may also and without departing from the scope of the present invention, be arranged in the thickness of the pod 3 or in the engaging pole 300 which allows the turbomachine 1 to be fixed to a wing of the aircraft (not illustrated), or in one of the branches 16, 17.

Furthermore, without departing from the scope of the present invention, the base 201 may be located upstream or downstream of the cross-section 202. This selection does not affect the performance levels of the deflector 200 according to the invention and is dictated only in accordance with geometric and/or practical considerations.

It should be noted that the invention applies to an air inlet which is at the surface or substantially at the surface of the wall 3a of the fan conduit 30. In this manner, in the examples illustrated in FIGS. 3 and 7, the air inlet 121 is at the same level as the wall 3a of the fan conduit while, in the examples of FIG. 4 or 8, the downstream inlet edge 121c extends slightly beyond the wall 3a (on the order of a few centimeters).

The invention, although described with an application for the air passage of the exchanger of a turbomachine, is used in fields in which phenomena of acoustic resonance inside a cavity may be produced, such as, for example, in wheel wells of aircraft, or fluid intake systems in the petroleum industry, etcetera.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft turbomachine comprising:
a fan conduit comprising a first wall, a flow of air through the aircraft turbomachine passing via the fan conduit;
an air passage comprising an air inlet opening arranged in the first wall, the air passage being configured to receive a first portion of the flow of the air, the air inlet opening formed between an upstream inlet edge and a downstream inlet edge;
a deflector fixed to the first wall upstream of the upstream inlet edge, the deflector comprising at least one deflector wall radially extending into the fan conduit from the first wall and configured to force a shear flow layer portion of the flow of the air to flow in a plane parallel with a longitudinal axis of the aircraft turbomachine such that the shear flow layer portion of the flow of the air does not strike the downstream inlet edge,
wherein the at least one deflector wall is porous comprising a plurality of passages covering 20% to 40% of a surface of the at least one deflector wall such that the deflector wall is configured to pass some of the first portion of the flow of the air through the plurality of passages.

2. The turbomachine as claimed in claim 1, wherein the plurality of passages comprise at least one of through-holes and notches.

3. The turbomachine as claimed in claim 2, wherein the plurality of passages comprise through-holes and wherein the through-holes each have a diameter greater than or equal to 2 mm and less than or equal to 4 mm.

4. The turbomachine as claimed in claim 2, wherein the plurality of passages comprise through-holes and wherein the through-holes all have an equal diameter.

5. The turbomachine as claimed in claim 2, wherein the plurality of passages comprise notches are arranged at a free edge of the at least one deflector wall.

6. The turbomachine as claimed in claim 1, wherein the at least one deflector wall has a length, in a radial dimension of the fan conduit, of between 1/10 and 1/30 of a dimension of the air inlet opening along the longitudinal axis of the turbomachine.

7. The turbomachine as claimed in claim 1, wherein the deflector comprises a base fixed to the first wall and wherein the at least one deflector wall is fixed to the base.

8. The turbomachine as claimed in claim 7, wherein the deflector wall and the base are perpendicular.

9. The turbomachine as claimed in claim 1, wherein the deflector is curved.

10. The turbomachine as claimed in claim 1, wherein the deflector is produced in two portions fixed to each other with an angle between them which is not equal to zero.

11. The turbomachine as claimed in claim 1, wherein the deflector extends, along an axis perpendicular to the flow of the air passing via the fan conduit, over a width that is 60% to 110% of a width of the air inlet opening along the axis perpendicular to the flow of the air passing via the fan conduit.

12. An aircraft turbomachine comprising:
a fan conduit comprising a first wall, a flow of air through the aircraft turbomachine passing via the fan conduit;
an air passage comprising an air inlet opening arranged in the first wall, the air passage being configured to receive a first portion of the flow of the air, the air inlet opening formed between an upstream inlet edge and a downstream inlet edge;
a deflector fixed to the first wall upstream of the upstream inlet edge, the deflector comprising at least one deflector wall radially extending into the fan conduit from the first wall and configured to force a shear flow layer portion of the flow of the air to flow in a plane parallel with a longitudinal axis of the aircraft turbomachine such that the shear flow layer portion of the flow of the air does not strike the downstream inlet edge, wherein the deflector comprises a base fixed to the first wall of the fan conduit and wherein the deflector wall is fixed to the base,
wherein the at least one deflector wall is porous comprising a plurality of passages covering 20% to 40% of a surface of the at least one deflector wall such that the deflector wall is configured to pass some of the first portion of the flow of the air through the plurality of passages,
wherein the deflector is curved or formed of two portions fixed to each other with a non-zero angle between them.

* * * * *